Patented May 7, 1935

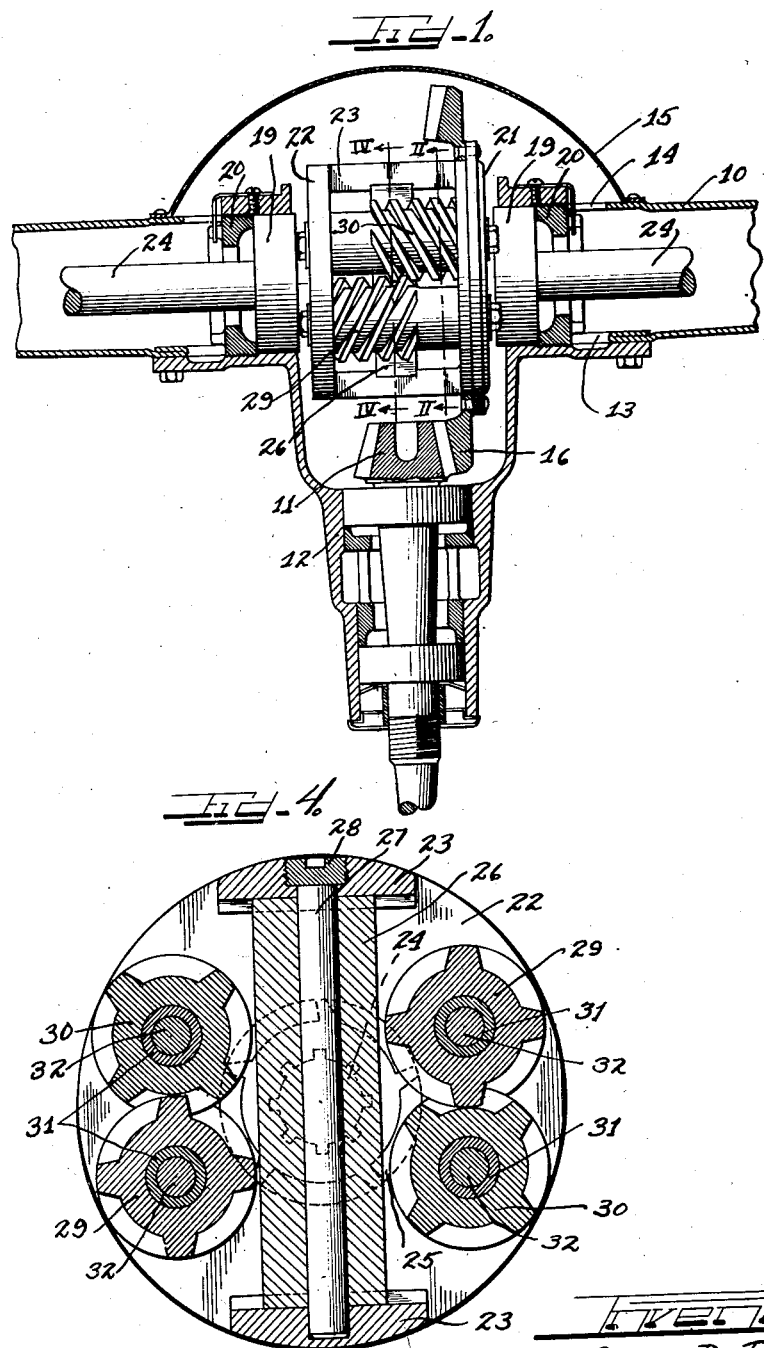

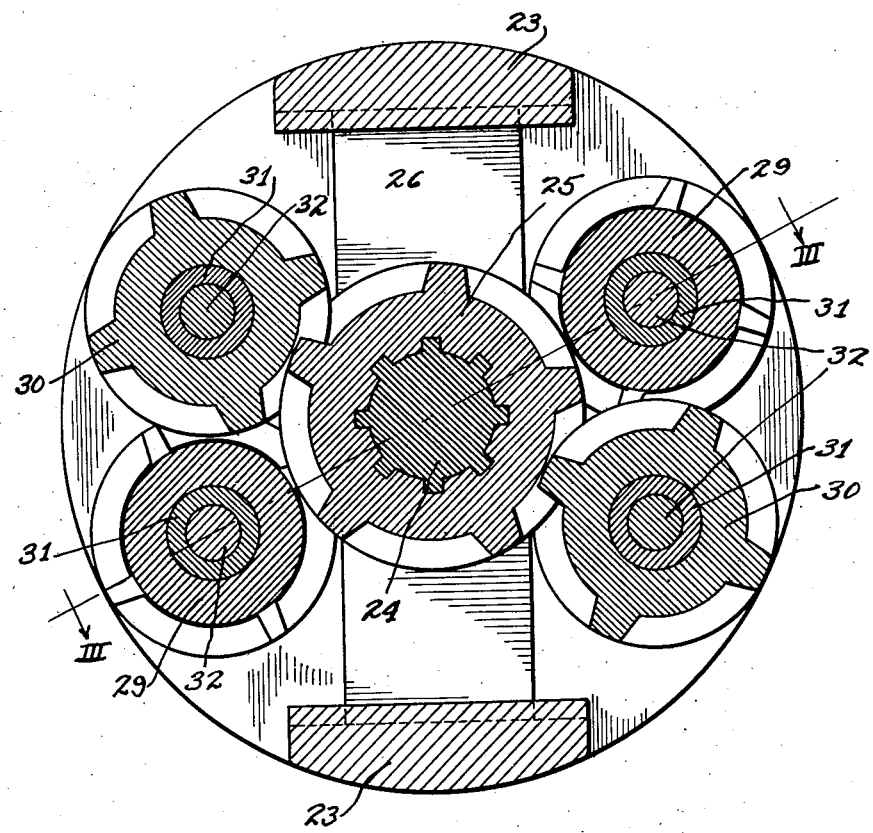

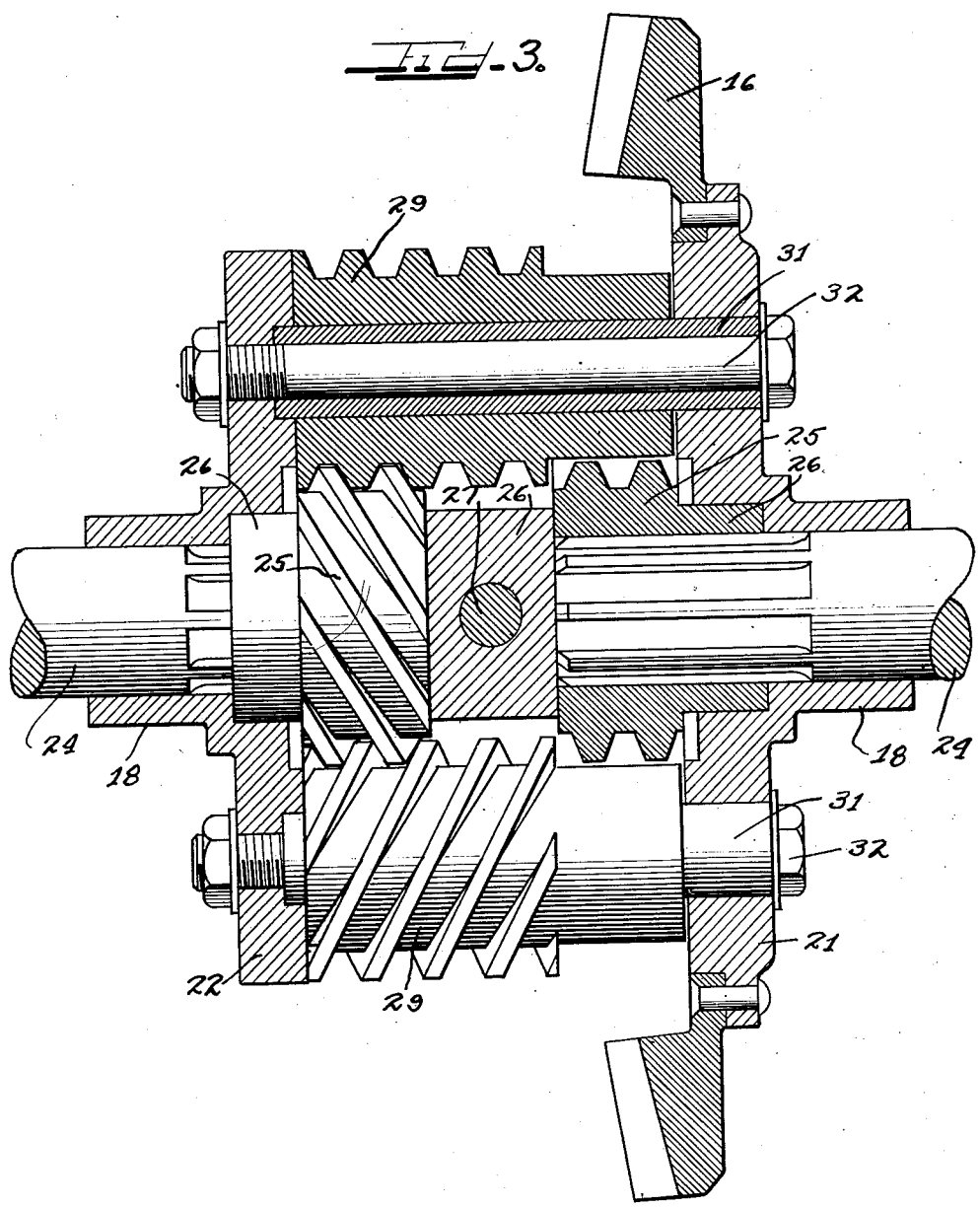

2,000,223

UNITED STATES PATENT OFFICE 2,000,223

SELF-LOCKING DIFFERENTIAL

Louis Du Pras, Marquette, Mich.

Application July 9, 1934, Serial No. 734,243

6 Claims. (Cl. 74—313)

This invention relates to an improved self-locking differential for automotive vehicles.

In the operation of automotive vehicles it is necessary to provide a differential action between the driving wheels and between driving axles where more than two wheels receive power, as in the case of four or six wheel drives. The differential is necessary because of curves and other road irregularities but becomes a drawback when one wheel of a pair loses traction, as in such circumstances the wheel tends to spin, as its mate can remain stationary due to the differential. This defect has prompted the design of various one-way clutches and the like tending to prevent or restrict such differential movements, but heretofore such designs have proved to be either impractical, unreliable, or too expensive and complicated for general adoption.

It is accordingly an important object of this invention to provide an improved self-locking differential that normally provides complete freedom for the equalizing effect of the differential while automatically transferring the entire driving load to the wheel having traction should the mating wheel lose its grip on the road for any reason.

It is a further object of this invention to provide a self-locking differential of the type described which is automatically operable in either direction of drive.

It is another object of this invention to provide an improved and simplified differential wherein self-locking is accomplished as an inherent feature of the gearing which normally provides the differential action compensating for variations in the rotary speeds of the wheels or driving axles connected thereby.

It is a further object of this invention to provide an improved and simplified self-locking differential that can be economically manufactured and assembled and that will be trouble-proof in service.

Other and further important objects of this invention will be apparent from the disclosures in the specification and the accompanying drawings.

This invention (in a preferred form) is illustrated in the drawings and hereinafter more fully described.

On the drawings:

Figure 1 is a fragmentary horizontal section through a rear axle housing with one embodiment of the differential of this invention installed therein.

Figure 2 is an enlarged section taken on the line II—II of Figure 1.

Figure 3 is an enlarged section on the line III—III of Figure 2.

Figure 4 is a section on the line IV—IV of Figure 1.

As shown on the drawings:

The self-locking differential of this invention has been shown in Figure 1 as installed in a conventional type of rear axle housing 10, and it is to be understood that the type of housing and drive pinion mounting is immaterial to the invention. As shown, the housing 10 is of the so-called banjo type wherein a drive pinion 11 is suitably journaled in a casting 12 which closes the front opening 13 in the axle housing, the rear opening 14 therein being closed by a removable cover 15 which permits inspection and adjustment of the rear axle gears. The pinion 11 drives a bevel ring gear 16 which is mounted on a differential cage having bosses 18 journaled in bearings 19 supported by the casting 12, the bearings being axially shiftable by threaded collars 20 to adjust the meshing of the pinion and ring gear.

In the illustrated embodiment of this invention the differential cage is intended to be made as a one-piece forging or casting to combine lightness with rigidity and strength, the cage comprising end discs 21 and 22 separated by spacers 23. It is obvious that this structure could be built up by welding or bolting the several parts together if so desired.

The previously mentioned bearing bosses 18 are formed as part of the discs 21 and 22 and are centrally bored out to receive the ends of axle shafts 24, each of which carry helical gears or worms 25 inside the end discs, which latter are preferably counterbored for hubs 26 forming parts of the gears 25 which hubs both journal the gears concentric with the bosses 18 and provide end thrust surfaces for the gears. The two gears 25 are spaced from each other to provide room for other gears to intermesh without directly overlapping both gears 25, and in the case of an integral cage a diametrically disposed spacer block 26 is mounted between the cage spacers 23 being held in place by a rod 27 retained in position by a threaded plug 28. If the cage were built up this spacer 26 could be incorporated with the gears 25, but with an integral cage a removable spacer is necessary to permit assembly of the gears 25 in the cage, and also takes the end thrust between the gears.

The gears 25 may conveniently be called the sun gears, and pairs of intermeshing satellite gears 29 and 30 are journaled on bushings 31 mounted between the discs 21 and 22 by bolts 32, one of each pair of satellite gears meshing with each of the sun gears but not with both. Considering only one pair of the satellite gears, one gear 29 meshes with both one sun gear and with its mating gear 30 which latter meshes with the other sun gear. If these gears are considered as spur gears for a moment it will be seen that we have a spur gear differential as one sun gear 25 can rotate clockwise, considering the cage as stationary, this gear rotating its satellite which rotates the other satellite, which in turn rotates the other sun gear counterclockwise.

If spur gears were used the differential effect would be similar to that of the conventional bevel differential. However, by the use of helical gears or worms, a helix angle can be chosen that will have a self-locking effect if one wheel should lose its traction. To facilitate this self-locking effect the satellite gears are slightly shorter than the space provided therefor between the end discs so that a reversal of torque, due to a slipping wheel, will act to shift the gears axially to increase the locking pressure between each sun gear and its intermeshing satellites, and between the two intermeshing satellites comprising each pair. The helix angle of the helical gears or worms generates end thrust when the gears are under torque, which end thrust provides the self-locking effect, upon release of the torque on one wheel, which forms the essential feature of this invention. It will be noted that since the intermeshing gears all have the same helix or pitch angle, the end thrust will be equalized when both wheels have traction so that the satellite gears will then float between the opposing thrusts and a free differential action will then be provided.

In the operation of the self-locking differential of this invention a normal free differential or equalizing action between the wheels is obtained as long as both wheels obtain traction, this action being equally effective in either direction of drive. Referring to Figure 1 the drive pinion will rotate counter-clockwise for a forward direction of motion of the wheels, rotating the entire cage clockwise when viewed from the right. Since the left hand sun gear meshes with one satellite gear of each pair and the right hand sun gear meshes with the other satellite gear of each pair, the two satellite gears of each pair also intermeshing with each other, we have a gear train indirectly coupling the two sun gears in such a way that the rotation of one sun gear relative to the cage produces an equal and opposite rotation of the other sun gear relative to the cage. For normal straight ahead motion of the vehicle, torque applied through the ring gear to the cage will be transmitted to both axle shafts which will rotate in unison without relative movement between either sun gear and the cage. Upon rounding a curve, while both wheels have traction, the longer orbit of the outside wheel will cause its axle and sun gear to rotate faster than the inside wheel, the differential action of the gearing causing the cage rotation, which may be assumed as constant, to be half way between the faster rotation of the outside wheel and the slower rotation of the inside wheel.

If one wheel should lose its traction as by bouncing off the road, or spinning in a mud hole, the release of torque due to loss of traction upsets the torque end thrust balancing effect in the train of helical gears, causing a slight shift of the satellite gears in a direction to cause an increase in the wedging action of the various teeth which tends to lock up the train of gears to prevent relative rotation between the two sun gears, the result being a self-locking action that transfers the driving torque to the wheel having traction until such time as the other wheel regains its grip on the road.

It will thus be seen that I have invented an improved and simplified differential that is automatically self-locking when either of the driven members loses its traction.

I am aware that many changes may be made and numerous details of construction may be varied through a wide range without departing from the principles of this invention, and I therefore do not purpose limiting the patent granted hereon otherwise than necessitated by the prior art.

I claim as my invention:

1. A self-locking differential gearing mechanism comprising a casing, a pair of independently mounted helical sun gears axially journaled relative to said casing, and a plurality of pairs of intermeshing helical satellite gears, said satellite gears being freely journaled in the casing in such a manner as to be permitted some longitudinal motion, one of each of said satellite gears intermeshing with one of each of said sun gears whereby to connect the sun gears through the intermeshing helical gears.

2. A self-locking differential gearing mechanism comprising a casing, a pair of independently mounted helical sun gears axially journaled relative to said casing, and a plurality of pairs of intermeshing helical satellite gears, said satellite gears having their axes parallel to the axis of the casing and being longitudinally movable relative thereto, one of each of said satellite gears intermeshing with one of each of said sun gears whereby to connect the sun gears through the intermeshing helical gears.

3. A differential mechanism for automotive vehicles comprising a casing driven from a source of power, axle shafts coaxially journaled in said casing, and helical gearing interconnecting said axle shafts and said casing in such a way as to maintain a predetermined relationship between the relative movements of said axle shafts, said helical gearing including longitudinally movable gears adapted to increase the tooth friction in the gear train when the resistance of one axle shaft becomes less than the resistance of the other.

4. A differential mechanism for automotive vehicles comprising a casing driven from a source of power, axle shafts coaxially journaled in said casing, and helical gearing interconnecting said axle shafts and said casing in such a way as to maintain a predetermined relationship between the relative movements of said axle shafts, said gearing including longitudinally movable floating idlers adapted to vary the tooth friction upon variation of the distribution of torque between the axle shafts.

5. A differential mechanism for automotive vehicles comprising a casing driven from a source of power, axle shafts coaxially journaled in said casing, and helical gearing interconnecting said axle shafts and said casing in such a way as to maintain a predetermined relationship between the relative movements of said axle shafts, said gearing being arranged with axes parallel to the axis of the axle shafts and including longitudinally movable floating idlers adapted to vary the tooth friction upon variation of the distribution of torque between the axle shafts.

6. A self-locking differential adapted to transmit power to independent coaxial driven shafts, comprising a casing in which said shafts are journaled, helical gears carried by each shaft, and a pair of intermeshing helical idler gears each of which meshes with one of the axle gears, said idler gears being longitudinally movable to vary the tooth friction upon upsetting the torque balance between the driven shafts.

LOUIS DU PRAS.